(12) United States Patent
Tu et al.

(10) Patent No.: US 12,208,726 B2
(45) Date of Patent: Jan. 28, 2025

(54) ADAPTIVE FRONT-LIGHTING SYSTEM CONTROL METHOD AND TERMINAL DEVICE, AND STORAGE MEDIUM

(71) Applicant: Xiamen Yaxon Zhilian Technology Co., Ltd., Fujian (CN)

(72) Inventors: Yankai Tu, Fujian (CN); Tengyuan Luo, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 0 days.

(21) Appl. No.: 18/005,633

(22) PCT Filed: Aug. 18, 2020

(86) PCT No.: PCT/CN2020/109707
§ 371 (c)(1),
(2) Date: Jan. 16, 2023

(87) PCT Pub. No.: WO2022/011773
PCT Pub. Date: Jan. 20, 2022

(65) Prior Publication Data
US 2023/0271547 A1    Aug. 31, 2023

(30) Foreign Application Priority Data
Jul. 15, 2020    (CN) .......................... 202010678057.2

(51) Int. Cl.
*B60Q 1/08*    (2006.01)

(52) U.S. Cl.
CPC ........ *B60Q 1/085* (2013.01); *B60Q 2300/112* (2013.01); *B60Q 2300/20* (2013.01); *B60Q 2300/324* (2013.01)

(58) Field of Classification Search
None
See application file for complete search history.

(56) References Cited

U.S. PATENT DOCUMENTS

| 2007/0025112 A1* | 2/2007 | Kuhl | B60Q 1/10 340/936 |
| 2011/0211359 A1* | 9/2011 | Shiao | B62J 6/026 362/476 |

(Continued)

FOREIGN PATENT DOCUMENTS

| CN | 103692955 A | 4/2014 |
| CN | 104175945 A | 12/2014 |

(Continued)

OTHER PUBLICATIONS

International Search Report cited in PCT/CN2020/109707 mailed Apr. 19, 2021, 7 pages.

(Continued)

*Primary Examiner* — Peter D Nolan
*Assistant Examiner* — Jacob Kent Besteman-Street
(74) *Attorney, Agent, or Firm* — Cooper Legal Group, LLC

(57) ABSTRACT

The disclosure relates to an adaptive front-lighting system control method and terminal device, and a storage medium. The method includes: calculating, based on gradient values of different gradient points in electronic horizon data ahead, a to-be-adjusted vertical adjustment angle of the adaptive front-lighting system, and adjusting an illumination angle of the adaptive front-lighting system with the vertical adjustment angle. The disclosure provides gradient information of the road out of view for control of the adaptive front-lighting system, optimizes the control of vertical angle, and can avoid the blind spot of illumination caused by the change in the gradient in simple angle control, thus being more suitable for the control of the adaptive front-lighting system in a gradient terrain.

9 Claims, 3 Drawing Sheets

(56) References Cited

U.S. PATENT DOCUMENTS

| | | | | |
|---|---|---|---|---|
| 2014/0286025 A1* | 9/2014 | Kamitani | ............... | B60Q 1/115 |
| | | | | 362/466 |
| 2015/0232017 A1* | 8/2015 | Ooishi | ................... | B60Q 1/085 |
| | | | | 701/48 |
| 2019/0031085 A1* | 1/2019 | Ba | ......................... | B60Q 1/085 |
| 2024/0083342 A1* | 3/2024 | Shim | ..................... | F21S 41/657 |

FOREIGN PATENT DOCUMENTS

| | | |
|---|---|---|
| CN | 105835754 A | 8/2016 |
| CN | 106032126 A | 10/2016 |
| CN | 109760583 A | 5/2019 |
| CN | 110893853 A | 3/2020 |
| KR | 20130115865 A | 10/2013 |

OTHER PUBLICATIONS

Written Opinion cited in PCT/CN2020/109707 mailed Apr. 19, 2021, 3 pages.

\* cited by examiner

ADAPTIVE FRONT-LIGHTING SYSTEM CONTROL METHOD AND TERMINAL DEVICE, AND STORAGE MEDIUM

TECHNICAL FIELD

The present invention relates to the field of intelligent control of vehicles, and in particular to an adaptive front-lighting system control method and terminal device, and a storage medium.

BACKGROUND

An adaptive front-lighting system (AFS) is a technique that changes the horizontal angle and vertical angle of lighting according to the environment of the vehicle. A typical method is to adjust the horizontal front-lighting angle based on data collected by a steering wheel steering sensor or to adjust the vertical front-lighting angle through a body inclination sensor. However, the sensors can only obtain the current state of the vehicle environment, but cannot obtain the environment data of the road ahead of the vehicle, failing in predicting the conditions of the road ahead. For a lighting system, it is of the greatest significance to ensure the brightness of the road ahead. Therefore, the traditional method cannot achieve the best effect.

In the invention patent with the publication number CN201610915320.9, environmental parameter information inside or outside the target tunnel is acquired through a camera or a sensor, and a corresponding driving control instruction is generated to control lights, thereby achieving the goal of safe driving. However, the camera or the sensor can only obtain environmental information that is a short distance ahead of the vehicle and in view, but cannot obtain environmental information of the road completely out of view in time. Moreover, the camera or the sensor can only be controlled to be on or off, and no angle optimization is involved. The paper "Analysis of AFS Based on Car Navigation Electronic Map", which uses the navigation map to optimize the horizontal front-lighting angle, can effectively predict the road ahead. However, the common navigation map has no road gradient information, so there is no optimization in vertical angle control. Moreover, when the terrain is a hillside, this simple angle control may lead to a blind spot of illumination because of the change in the gradient. For example, in FIG. 1, the illumination angle is selected according to the gradient S of the current position of the vehicle, and the blind spot of illumination is produced because of the change in the gradient ahead. In FIG. 2, the illumination angle is selected according to the gradient S of the expected farthest position of illumination. The lights cannot actually illuminate the expected position because of the difference between the gradient S of the expected farthest position of illumination and the gradient of the current position of the vehicle, causing the blind spot.

SUMMARY

In order to solve the above problem, the present invention provides an adaptive front-lighting system control method and terminal device, and a storage medium.

The specific solutions are as follows:

Provided is an adaptive front-lighting system control method, including: calculating, based on gradient values of different gradient points in electronic horizon data ahead, a to-be-adjusted vertical adjustment angle of the adaptive front-lighting system, and adjusting an illumination angle of the adaptive front-lighting system with the vertical adjustment angle.

Further, a method of calculating the to-be-adjusted vertical adjustment angle of the adaptive front-lighting system includes:
determining a safe sight distance corresponding to a current position of a vehicle according to a current speed of vehicle;
calculating, in combination with the electronic horizon data ahead, a difference of view inclination of each gradient point relative to the current position of the vehicle within the safe sight distance; where the difference of view inclination is an absolute value of a difference between the view inclination of the current position of the vehicle and a road inclination corresponding to the current position of the vehicle;
screening the gradient points sequentially from the farthest gradient point within the safe sight distance until the differences of view inclination corresponding to all the gradient points between the screened gradient point and the current position of the vehicle are within a lighting angle range corresponding to the screened gradient point; and
using the difference of view inclination corresponding to the screened gradient point as the vertical adjustment angle of the adaptive front-lighting system.

Further, the safe sight distance is calculated based on the current speed of vehicle and a driver reaction time.

Further, a method of calculating the view inclination of each gradient point relative to the current position of the vehicle includes:
acquiring, according to the electronic horizon data ahead, gradient values of all the gradient points between the gradient point and the current position of the vehicle;
calculating, based on all the acquired gradient values and a road length between every two adjacent gradient points, a horizontal distance and a vertical distance corresponding to each gradient point relative to a next gradient point;
accumulating the horizontal distances and the vertical distances of all the gradient points respectively to obtain a horizontal distance and a vertical distance between the gradient point to be calculated and the current position of the vehicle; and
calculating, based on the horizontal distance and the vertical distance, the view inclination.

Further, a calculation formula of the horizontal distance corresponding to the gradient point relative to the next gradient point is:

$$w_i = \frac{T_i}{\sqrt{1+S_i^2}}$$

where $w_i$ represents the horizontal distance between the i-th gradient point and the (i+1)-th gradient point, $S_i$ represents the gradient value of the i-th gradient point, and $T_i$ represents the road length between the i-th gradient point and the (i+1)-th gradient point.

Further, a calculation formula of the vertical distance corresponding to the gradient point relative to the next gradient point is:

$$h_i = \text{sign}(S_i) \frac{S_i T_i}{\sqrt{1+S_i^2}}$$

where $h_i$ represents the vertical distance between the i-th gradient point and the (i+1)-th gradient point, the function sign($S_i$) indicates that when $S_i \geq 0$, sign($S_i$)=1, otherwise, sign($S_i$)=−1, $S_i$ represents the gradient value of the i-th gradient point, and $T_i$ represents the road length between the i-th gradient point and the (i+1)-th gradient point.

Further, a method of screening the gradient points sequentially from the farthest gradient point within the safe sight distance includes:

step I: setting the farthest gradient point within the safe sight distance as a gradient point to be selected;

step II: calculating the lighting angle range of the gradient point to be selected, and determining whether there exists a gradient point between the current position of the vehicle and the gradient point to be selected that has a difference of view inclination beyond the lighting angle range of the gradient point to be selected; if so, proceeding to step III, otherwise, using the gradient point to be selected as the screened gradient point; and step III: setting the next gradient point of the gradient point to be selected toward the current position of the vehicle as the gradient point to be selected, and returning to step II.

Further, a method of setting the lighting angle range includes: setting the difference of view inclination corresponding to the gradient point as $\theta'_r$, and a maximum upward lighting angle and a maximum downward lighting angle of the adaptive front-lighting system as $A_1$ and $A_2$ respectively, and then obtaining the lighting angle range corresponding to the gradient point $[\theta'_r - A_2, \theta'_r + A_1]$.

Provided is an adaptive front-lighting system control terminal device, including a processor, a memory, and a computer program stored in the memory and running in the processor. The processor, when executing the computer program, implements the steps in the method in the embodiments of the present invention.

Provided is a computer-readable storage medium having a computer program stored thereon. The computer program, when executed by a processor, implements the steps in the method in the embodiments of the present invention.

By using the technical solutions above, the present invention provides gradient information of the road out of view for control of the adaptive front-lighting system based on electronic horizon technology, optimizes the control of vertical angle, and can avoid the blind spot of illumination caused by the change in the gradient in simple angle control, thus being more suitable for the control of the adaptive front-lighting system in a gradient terrain.

DESCRIPTION OF EMBODIMENTS

To further illustrate the embodiments, the accompanying drawings are provided in the present invention. These accompanying drawings are a part of the contents disclosed in the present invention that are mainly used to illustrate the embodiments, and can be used in conjunction with the related descriptions in the specification to explain the operation principle of the embodiments. With reference to these contents, those skilled in the art will be able to understand other possible implementations and advantages of the present invention.

The present invention will be further described in conjunction with the accompanying drawings and the specific implementations.

Embodiment I

Figure 1:
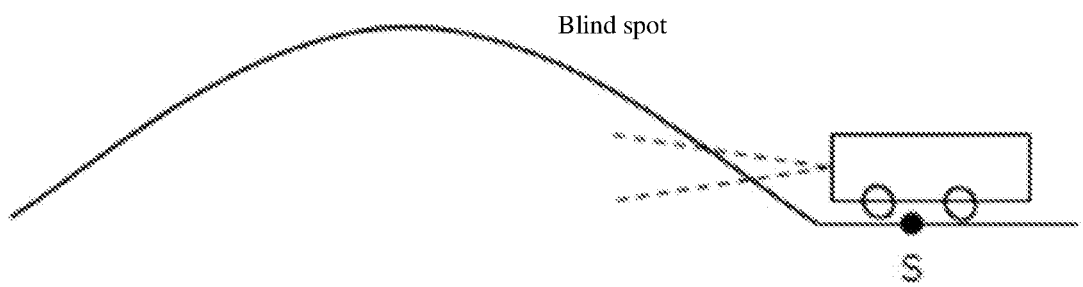
FIG. 1 shows a schematic diagram of a blind spot caused by determining a vertical illumination angle according to a current gradient S.
Figure 2:
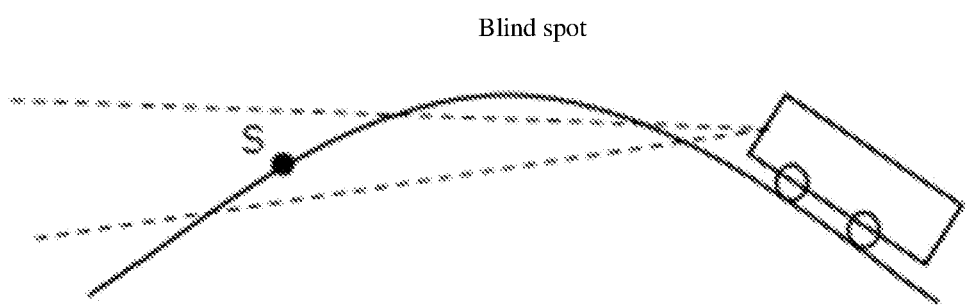
FIG. 2 shows a schematic diagram of a blind spot caused by determining a vertical illumination angle according to a gradient S of an expected illumination distance ahead.
Figure 3:
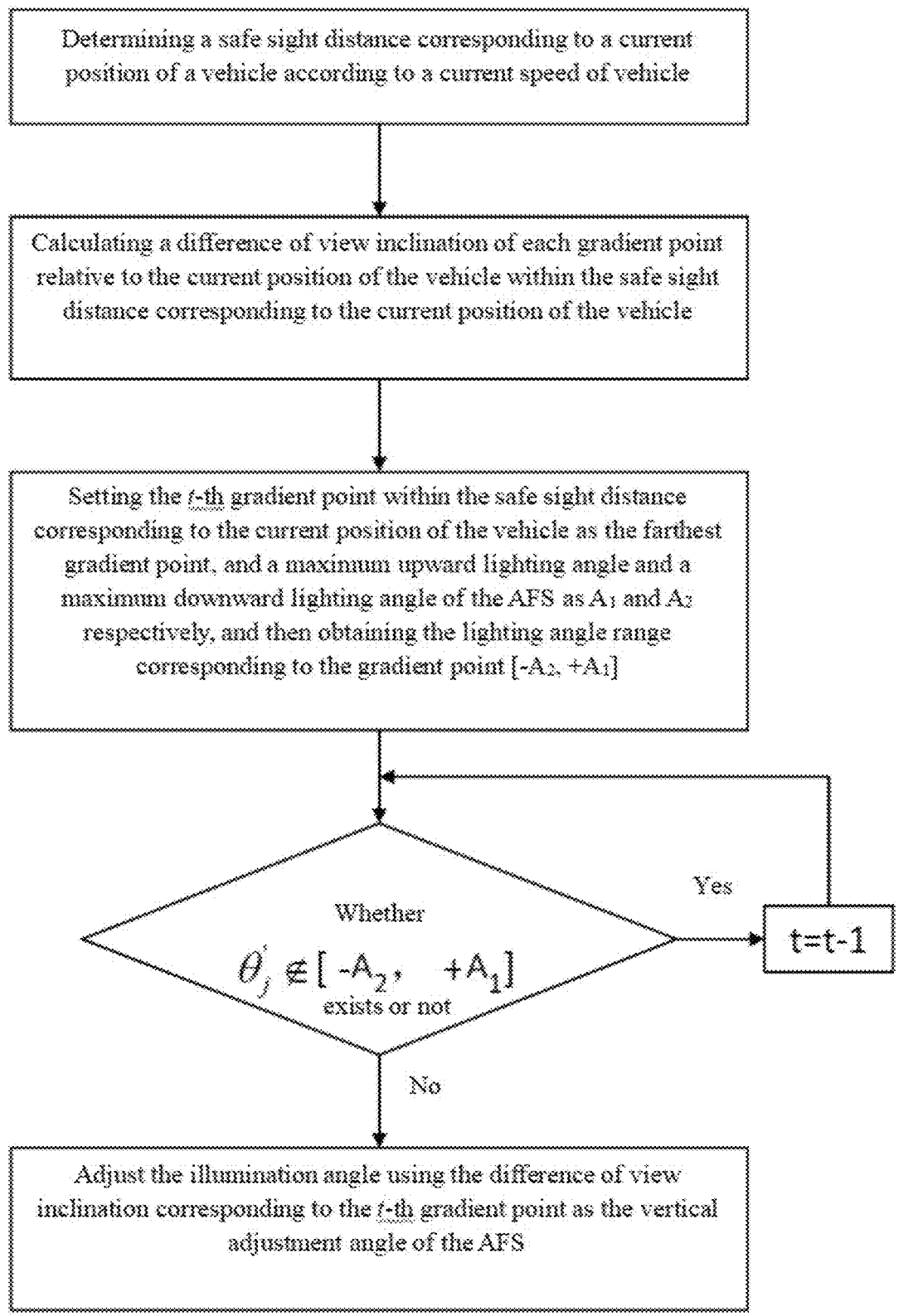
FIG. 3 shows a flowchart of Embodiment I of the present invention.

As shown in FIG. 3, the present invention provides an adaptive front-lighting system control method, including the following steps:

S1: Determine a safe sight distance D corresponding to a current position of a vehicle according to a current speed of vehicle.

In this embodiment, the safe sight distance D is obtained by calculating the product of the current speed of vehicle and a driver reaction time. For example, if the driver reaction time is a seconds and the speed of vehicle is v, then the safe sight distance is D=a*v. The driver reaction time can be set by those skilled in the art according to experience, and is not limited here.

Figure 4:
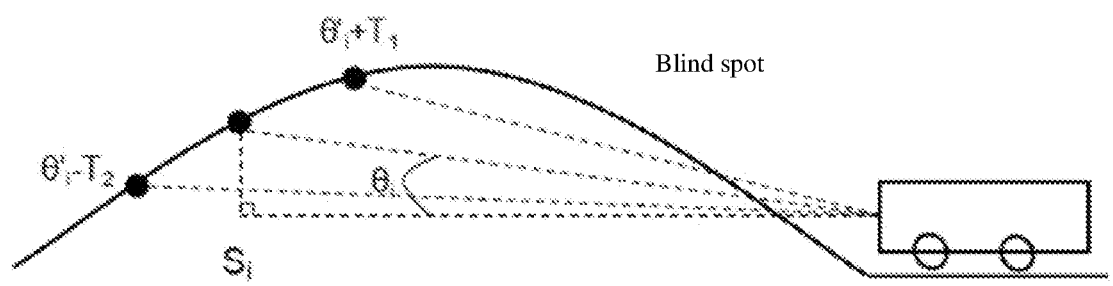
FIG. 4 is a schematic diagram showing the existence of a blind spot in Embodiment I.

S2: Calculate, in combination with the electronic horizon data ahead, a difference of view inclination $\theta'_i$ of each gradient point relative to the current position of the vehicle within the safe sight distance corresponding to the current position of the vehicle. The specific process is as follows:

As shown in FIG. 4, given that the gradient value corresponding to the i-th gradient point is $S_i$, the subscript i represents the number of the gradient point, i=1, 2, 3, ..., and $\theta_i$ represents an included angle between the road corresponding to the i-th gradient point and the horizontal plane, then when the vehicle runs from the i-th gradient point to the (i+1)-th gradient point, the corresponding gradient value is the gradient value of the i-th gradient point in the electronic horizon data, $\tan \theta_i = S_i$.

From FIG. 4, it can be concluded that:

$$\sin\theta_i = \frac{h_i}{T_i} \tag{1}$$

$$\cos\theta_i = \frac{w_i}{T_i} = \frac{\sqrt{T_i^2 - h_i^2}}{T_i} \tag{2}$$

$$\tan\theta_i = \frac{\sin\theta_i}{\cos\theta_i} = \frac{h_i}{\sqrt{T_i^2 - h_i^2}} = S_i \tag{3}$$

Therefore, $$h_i = S_i \sqrt{T_i^2 - h_i^2} \tag{4}$$

Then:

$$h_i = \text{sign}(S_i) \frac{S_i T_i}{\sqrt{1 + S_i^2}} \tag{5}$$

Get:

where the function sign($S_i$) indicates that when $S_i \geq 0$, sign($S_i$)=1, indicating uphill, otherwise, sign($S_i$)=−1, indicating downhill; $w_i$ represents the horizontal distance between the i-th gradient point and the (i+1)-th gradient point, $h_i$ represents the vertical distance between the i-th gradient point and the (i+1)-th gradient point, and $T_i$ represents the road length between the i-th gradient point and the (i+1)-th gradient point.

$$\text{Since } w_i = \sqrt{T_i^2 - h_i^2} \quad (6)$$

formula (5) is substituted into formula (6) to get:

$$w_i = \frac{T_i}{\sqrt{1 + S_i^2}} \quad (7)$$

Thus, $h_i$ and $w_i$ corresponding to the i-th gradient point are solved.

Then, $h_k$ and $w_k$ values corresponding to all the gradient points before the i-th gradient point are accumulated, and the included angle formed by the connecting line between the i-th gradient point and the current position of the vehicle and the horizontal direction can be obtained. That is, the view inclination $\theta_i$ of the i-th gradient point is:

$$\theta_i = \arctan \frac{\sum_{k=0}^{k=i} \text{sign}(S_k) \frac{S_k}{\sqrt{1 + S_k^2}}}{\sum_{k=0}^{k=i} \frac{1}{\sqrt{1 + S_k^2}}} \quad (8)$$

where k represents the number of the gradient point.

Since the current position of the vehicle also has a gradient value, set as $S_c$, the road inclination $\theta_c$ corresponding to the current position of the vehicle is $\theta_c = \arcsin S_c$, and then the difference of view inclination $\theta'_i$ of the i-th gradient point relative to the current position of the vehicle within the safe sight distance corresponding to the current position of the vehicle is:

$$\theta'_i = |\theta_i - \theta_c|$$

S3: Set a t-th gradient point within the safe sight distance corresponding to the current position of the vehicle as the farthest gradient point, the corresponding gradient value as $S_t$, the corresponding difference of view inclination as $\theta'_t$, and a maximum upward lighting angle and a maximum downward lighting angle of the AFS as $A_1$ and $A_2$ respectively, and then obtain the lighting angle range corresponding to the gradient point $[\theta'_t - A_2, \theta'_t + A_1]$.

S4: Determine whether there exists a gradient point $S_j$, j<t, that satisfies $\theta'_j \notin [\theta'_t - T_2, \theta'_t + T_1]$; if so, it indicates that there exists a blind spot of illumination, as shown in FIG. 4, and proceed to S5; otherwise, proceed to S6.

S5: Let t=t−1, and return to S4.

S6: Adjust the illumination angle of the adaptive front-lighting system using the difference of view inclination $\theta'_t$ corresponding to the t-th gradient point as the vertical adjustment angle of the adaptive front-lighting system.

The technical solution used in Embodiment I of the present invention can predict the conditions of the road ahead according to the electronic horizon data so as to adjust the illumination angle of the adaptive front-lighting system. This technical solution not only overcomes the defect that the traditional camera or sensor has no foresight when acquiring the information of the road ahead, but also can adapt to the road conditions with complicated gradients. By way of dynamic adjustment rather than adjustment of a fixed angle, the adjustment angle is more appropriate, and this dynamic adjustment can affect other vehicles as little as possible (a too large adjustment angle may create a high beam effect on the oncoming vehicle and affect the safety of the driver in the oncoming vehicle). Further, this embodiment also solves the problem of the blind spot of view that has not been solved in the prior art. By adjusting the selected angle, the lighting can be as long as possible, and there is no blind spot, which optimizes the control and ensures the vehicle safety. The technical effects above cannot be achieved only by simply adjusting a fixed angle according to the gradient value.

Embodiment II

The present invention further provides an adaptive front-lighting system control terminal device, including a memory, a processor, and a computer program stored in the memory and capable of running in the processor. The processor, when executing the computer program, implements the steps in the method embodiment in Embodiment I of the present invention.

Further, as a feasible implementation, the adaptive front-lighting system control terminal device may be an on-board computer, a cloud server or other computing devices. The adaptive front-lighting system control terminal device may include, but not limited to, a processor and a memory. It can be understood by those skilled in the art that the composition of the adaptive front-lighting system control terminal device is merely an example of the adaptive front-lighting system control terminal device, and does not constitute a limitation to the adaptive front-lighting system control terminal device. The adaptive front-lighting system control terminal device may include more or less components than the above, or a combination of some components, or different components. For example, the adaptive front-lighting system control terminal device may further include input-output devices, network access devices, buses, etc., which is not limited by the embodiment of the present invention.

Further, as a feasible implementation, the processor may be a central processing unit (CPU), other general-purpose processors, a digital signal processor (DSP), an application specific integrated circuit (ASIC), a field-programmable gate array (FPGA) or other programmable logic devices, a discrete gate or transistor logic device, a discrete hardware component, etc. The general-purpose processor may be a microprocessor, or the processor may also be any conventional processor, etc. The processor is the control center of the adaptive front-lighting system control terminal device, and connects all parts of the entire adaptive front-lighting system control terminal device using various interfaces and lines.

The memory can be used for storing the computer program and/or module. The processor implements various functions of the adaptive front-lighting system control terminal device by running or executing the computer program and/or module stored in the memory and calling the data stored in the memory. The memory may mainly include a program storage area and a data storage area. The program storage area may store an operating system and application programs required by at least one function. The data storage area may store data created during running of the program, etc. Besides, the memory may include a high-speed random access memory, and may further include a non-volatile memory, such as a hard disk, an internal memory, a plug-in hard disk, a smart media card (SMC), a secure digital (SD) card, a flash card, at least one disk memory device, a flash memory device, or other volatile solid-state memory devices.

The present invention further provides a computer-readable storage medium having a computer program stored thereon. The computer program, when executed by a processor, implements the steps in the method in the embodiments of the present invention.

If an integrated module/unit of the adaptive front-lighting system control terminal device is implemented in the form of a software functional unit and sold or used as an independent product, it can be stored in a computer-readable storage medium. Based on such understanding, the implementation of all or part of the processes in the method of the embodiments of the present invention may also be completed by instructing related hardware by the computer program. The computer program may be stored in a computer-readable storage medium. The computer program, when executed by the processor, can implement the steps in the method embodiments. The computer program includes a computer program code, which may be in the form of a source code, an object code or an executable file, or in some intermediate forms. The computer-readable medium may include: any entity or apparatus capable of carrying the computer program code, a recording medium, a USB flash drive, a removable hard drive, a magnetic disk, an optical disk, a computer memory, a read-only memory (ROM), a random access memory (RAM), a software distribution medium, etc.

Although the present invention has been specifically shown and described in connection with the preferred implementations, it should be understood by those skilled in the art that various changes in form and details can be made without departing from the spirit and scope of the present invention as defined by the appended claims, and shall all fall within the protection scope of the present invention.

The invention claimed is:

1. An adaptive front-lighting system control method, comprising:
  calculating, based on gradient values of different gradient points in electronic horizon data ahead, a to-be-adjusted vertical adjustment angle of the adaptive front-lighting system, and adjusting an illumination angle of the adaptive front-lighting system with the vertical adjustment angle;
  wherein a method of calculating the to-be-adjusted vertical adjustment angle of the adaptive front-lighting system comprises:
    determining a safe sight distance corresponding to a current position of a vehicle according to a current speed of the vehicle;
    calculating, in combination with the electronic horizon data ahead, a difference of view inclination of each gradient point relative to the current position of the vehicle within the safe sight distance; where the difference of view inclination is an absolute value of a difference between the view inclination of the current position of the vehicle and a road inclination corresponding to the current position of the vehicle;
    screening the gradient points sequentially from a farthest gradient point within the safe sight distance until the differences of view inclination corresponding to all the gradient points between the screened gradient point and the current position of the vehicle are within a lighting angle range corresponding to the screened gradient point; and
    using the difference of view inclination corresponding to the screened gradient point as the vertical adjustment angle of the adaptive front-lighting system.

2. The method according to claim 1, wherein the safe sight distance is calculated based on the current speed of the vehicle and a driver reaction time.

3. The method according to claim 1, wherein a method of calculating the view inclination of each gradient point relative to the current position of the vehicle comprises:
  acquiring, according to the electronic horizon data ahead, gradient values of all the gradient points between the gradient point and the current position of the vehicle;
  calculating, based on all the acquired gradient values and a road length between every two adjacent gradient points, a horizontal distance and a vertical distance corresponding to each gradient point relative to a next gradient point;
  accumulating the horizontal distances and the vertical distances of all the gradient points respectively to obtain a horizontal distance and a vertical distance between the gradient point to be calculated and the current position of the vehicle; and
  calculating, based on the horizontal distance and the vertical distance between the gradient point to be calculated and the current position of the vehicle, the view inclination.

4. The method according to claim 3, wherein a calculation formula of the horizontal distance corresponding to the gradient point relative to the next gradient point is:

$$w_i = \frac{T_i}{\sqrt{1+S_i^2}}$$

wherein $w_i$ represents the horizontal distance between the i-th gradient point and the (i+1)-th gradient point, $S_i$ represents the gradient value of the i-th gradient point, and $T_i$ represents the road length between the i-th gradient point and the (i+1)-th gradient point.

5. The method according to claim 3, wherein a calculation formula of the vertical distance corresponding to the gradient point relative to the next gradient point is:

$$h_i = \text{sign}(S_i)\frac{S_i T_i}{\sqrt{1+S_i^2}}$$

wherein $h_i$ represents the vertical distance between the i-th gradient point and the (i+1)-th gradient point, the function sign $(S_i)$ indicates that when $S_i$—0, sign $(S_i)=1$, otherwise, sign $(S_i)=-1$, $S_i$ represents the gradient value of the i-th gradient point, and $T_i$ represents the road length between the i-th gradient point and the (i+1)-th gradient point.

6. The method according to claim 1, wherein a method of screening the gradient points sequentially from the farthest gradient point within the safe sight distance comprises:
  step I: setting the farthest gradient point within the safe sight distance as a gradient point to be selected;
  step II: calculating the lighting angle range of the gradient point to be selected, and determining whether there exists a gradient point between the current position of the vehicle and the gradient point to be selected that has a difference of view inclination beyond the lighting angle range of the gradient point to be selected; when so, proceeding to step III, otherwise, using the gradient point to be selected as the screened gradient point; and step III: setting the next gradient point of the gradient point to be selected toward the current position of the vehicle as the gradient point to be selected, and returning to step II.

7. The method according to claim 1, wherein a method of setting the lighting angle range comprises: setting the difference of view inclination corresponding to the gradient point as $\theta'_t$, and a maximum upward lighting angle and a maximum downward lighting angle of the adaptive front-lighting system $A_1$ and $A_2$ respectively, and then obtaining the lighting angle range corresponding to the gradient point $[\theta'_t - A_2, \theta'_t + A_1]$.

8. An adaptive front-lighting system control terminal device, comprising a processor, a memory, and a computer program stored in the memory and running in the processor, wherein the processor, when executing the computer program, implements the method according to claim 1.

9. A non-transitory computer-readable storage medium having a computer program stored thereon, wherein the computer program, when executed by a processor, implements the method according to claim 1.

* * * * *